US012683090B2

(12) United States Patent
Mano et al.

(10) Patent No.: US 12,683,090 B2
(45) Date of Patent: Jul. 14, 2026

(54) ELECTROLYTIC CAPACITOR ELEMENT AND ELECTROLYTIC CAPACITOR

(71) Applicant: Murata Manufacturing Co., Ltd., Nagaokakyo (JP)

(72) Inventors: Kyotaro Mano, Nagaokakyo (JP); Yasutake Fukuda, Nagaokakyo (JP); Wataru Onishi, Nagaokakyo (JP); Shogo Matsui, Nagaokakyo (JP); Haruko Kubo, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 160 days.

(21) Appl. No.: 18/826,699

(22) Filed: Sep. 6, 2024

(65) Prior Publication Data

US 2024/0429000 A1     Dec. 26, 2024

Related U.S. Application Data

(63) Continuation of application No. PCT/JP2022/042651, filed on Nov. 17, 2022.

(30) Foreign Application Priority Data

Mar. 7, 2022     (JP) ................................. 2022-034589

(51) Int. Cl.
H01G 9/10          (2006.01)
H01G 9/012         (2006.01)
(Continued)

(52) U.S. Cl.
CPC .............. H01G 9/10 (2013.01); H01G 9/012 (2013.01); H01G 9/0425 (2013.01); H01G 9/048 (2013.01)

(58) Field of Classification Search
CPC ........ H01G 9/10; H01G 9/012; H01G 9/0425; H01G 9/048
See application file for complete search history.

(56) References Cited

U.S. PATENT DOCUMENTS 10,879,011 B2    12/2020 Furukawa et al.
11,437,198 B2     9/2022 Furukawa et al.
(Continued)

FOREIGN PATENT DOCUMENTS

JP        2008-028137 A      2/2008
JP        2014-022508 A      2/2014
(Continued)

OTHER PUBLICATIONS

International Search Report received for PCT Patent Application No. PCT/JP2022/042651, mailed on Jan. 31, 2023, 2 pages (English Translation only).

*Primary Examiner* — Michael P McFadden
(74) *Attorney, Agent, or Firm* — ArentFox Schiff LLP

(57) ABSTRACT

An electrolytic capacitor element including: a valve-acting metal substrate including a core portion made of metal foil and a porous portion along a surface of the metal foil; a dielectric layer on the porous portion; a solid electrolyte layer on the dielectric layer; and a conductive layer on the solid electrolyte layer, the conductive layer including a carbon layer, the carbon layer containing a carbon filler and a scaly insulating inorganic filler, wherein, in a cut section of the electrolytic capacitor element in a direction perpendicular to a main face of the metal foil, an average of acute angles between a longitudinal direction of a cross-section of the insulating inorganic filler in the carbon layer adjacent to the main face of the metal foil and a longitudinal direction of a cross-section of the metal foil is 0° to 45°.

19 Claims, 7 Drawing Sheets

(51) Int. Cl.
H01G 9/042 (2006.01)
H01G 9/048 (2006.01)

(56) References Cited

U.S. PATENT DOCUMENTS

| | | |
|---|---|---|
| 11,456,121 B2 | 9/2022 | Iwaoka et al. |
| 2015/0086881 A1* | 3/2015 | Zhamu .................. H01G 11/68 |
| | | 429/231.95 |
| 2018/0145316 A1* | 5/2018 | Moon .................. H01M 4/134 |
| 2019/0122827 A1 | 4/2019 | Furukawa et al. |
| 2021/0074484 A1 | 3/2021 | Furukawa et al. |
| 2021/0091368 A1* | 3/2021 | House .................. H01M 4/525 |
| 2021/0125787 A1 | 4/2021 | Iwaoka et al. |

FOREIGN PATENT DOCUMENTS

| | | |
|---|---|---|
| JP | 2019-004100 A | 1/2019 |
| JP | 2019-079866 A | 5/2019 |
| WO | 2019/167774 A1 | 9/2019 |

* cited by examiner

ELECTROLYTIC CAPACITOR ELEMENT AND ELECTROLYTIC CAPACITOR

CROSS REFERENCE TO RELATED APPLICATIONS

The present application is a continuation of International application No. PCT/JP2022/042651, filed Nov. 17, 2022, which claims priority to Japanese Patent Application No. 2022-034589, filed Mar. 7, 2022, the entire contents of each of which are incorporated herein by reference.

TECHNICAL FIELD

The present disclosure relates to electrolytic capacitor elements and electrolytic capacitors.

BACKGROUND ART

WO 2019/167774 ("Patent Literature 1") discloses an electrolytic capacitor including a capacitor element provided with an anode, a dielectric layer at least partially covering the anode, a solid electrolyte layer at least partially covering the dielectric layer, and a cathode lead-out layer at least partially covering the solid electrolyte layer. The cathode lead-out layer includes a conductive carbon layer at least partially covering the solid electrolyte layer and a silver paste layer at least partially covering the carbon layer. The carbon layer contains carbon particles and silver.

SUMMARY OF THE DISCLOSURE

The anode in the electrolytic capacitor in Patent Literature 1 is made of metal foil such as aluminum foil. Moisture entering the electrolytic capacitor containing metal foil corrodes the metal foil, unfortunately causing leakage current failure (LC failure).

In particular, the moisture may reach the metal foil via the carbon layer. Prevention of water entry through this route is desired.

The present disclosure aims to solve the above-described problems and to provide electrolytic capacitor elements and electrolytic capacitors each capable of preventing or reducing corrosion of metal foil caused by moisture entry.

The electrolytic capacitor element of the present disclosure includes: a valve-acting metal substrate including a core portion made of metal foil and a porous portion along a surface of the metal foil; a dielectric layer on the porous portion; a solid electrolyte layer on the dielectric layer; and a conductive layer on the solid electrolyte layer, the conductive layer including a carbon layer, the carbon layer containing a carbon filler and a scaly insulating inorganic filler, wherein, in a cut section of the electrolytic capacitor element in a direction perpendicular to a main face of the metal foil, an average of acute angles between a longitudinal direction of a cross-section of the insulating inorganic filler in the carbon layer adjacent to the main face of the metal foil and a longitudinal direction of a cross-section of the metal foil is 0° to 45°.

The electrolytic capacitor of the present disclosure includes a stack of the electrolytic capacitor elements of the present disclosure; an external anode electrode; and an external cathode electrode.

The present disclosure can provide electrolytic capacitor elements and electrolytic capacitors each capable of preventing or reducing corrosion of metal foil caused by moisture entry.

DESCRIPTION OF THE PREFERRED EMBODIMENTS

The electrolytic capacitor element and the electrolytic capacitor of the present disclosure are described below.

The present disclosure is not limited to the following embodiments, and may be appropriately modified and applied without departing from the gist of the present disclosure. The present disclosure also includes a combination of two or more of individual desirable embodiments described below.

The electrolytic capacitor element of the present disclosure includes: a valve-acting metal substrate including a core portion made of metal foil and a porous portion along a surface of the metal foil; a dielectric layer on the porous portion; a solid electrolyte layer on the dielectric layer; and a conductive layer on the solid electrolyte layer, the conductive layer including a carbon layer, the carbon layer containing a carbon filler and a scaly insulating inorganic filler, wherein, in a cut section of the electrolytic capacitor element in a direction perpendicular to a main face of the metal foil, an average of acute angles between a longitudinal direction of a cross-section of the insulating inorganic filler in the carbon layer adjacent to the main face of the metal foil and a longitudinal direction of a cross-section of the metal foil is 0° to 45°.

Figure 1:
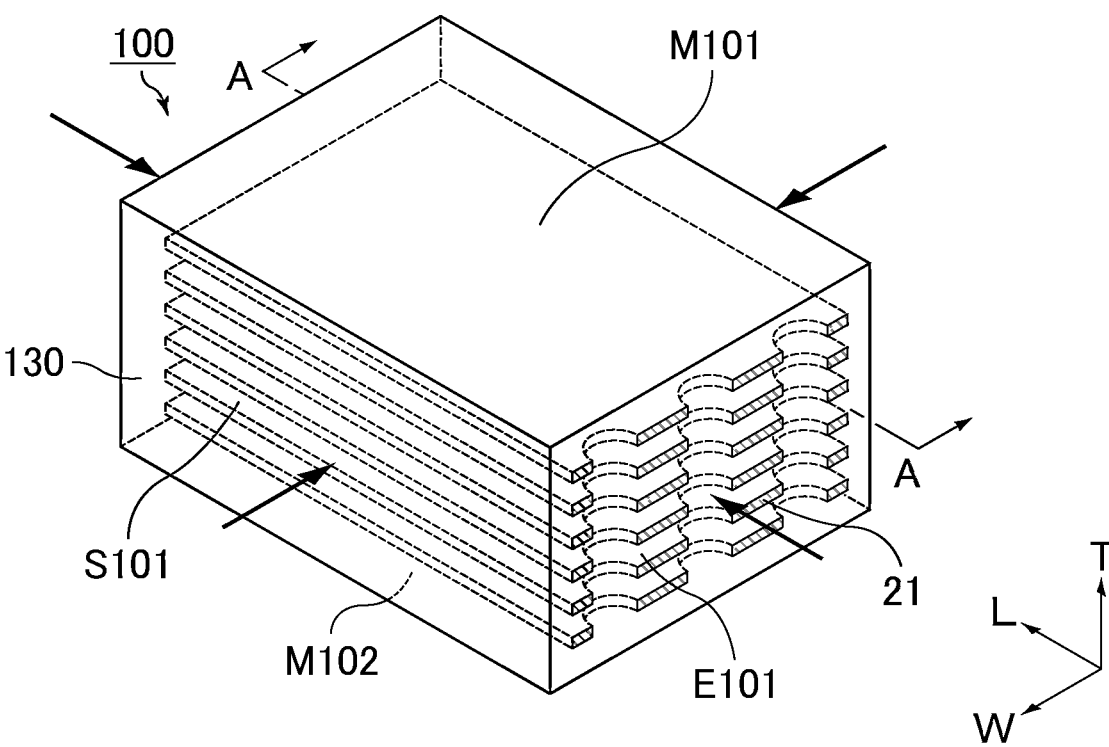
FIG. 1 is a perspective view schematically showing an example of a stack of electrolytic capacitor elements.
Figure 2:
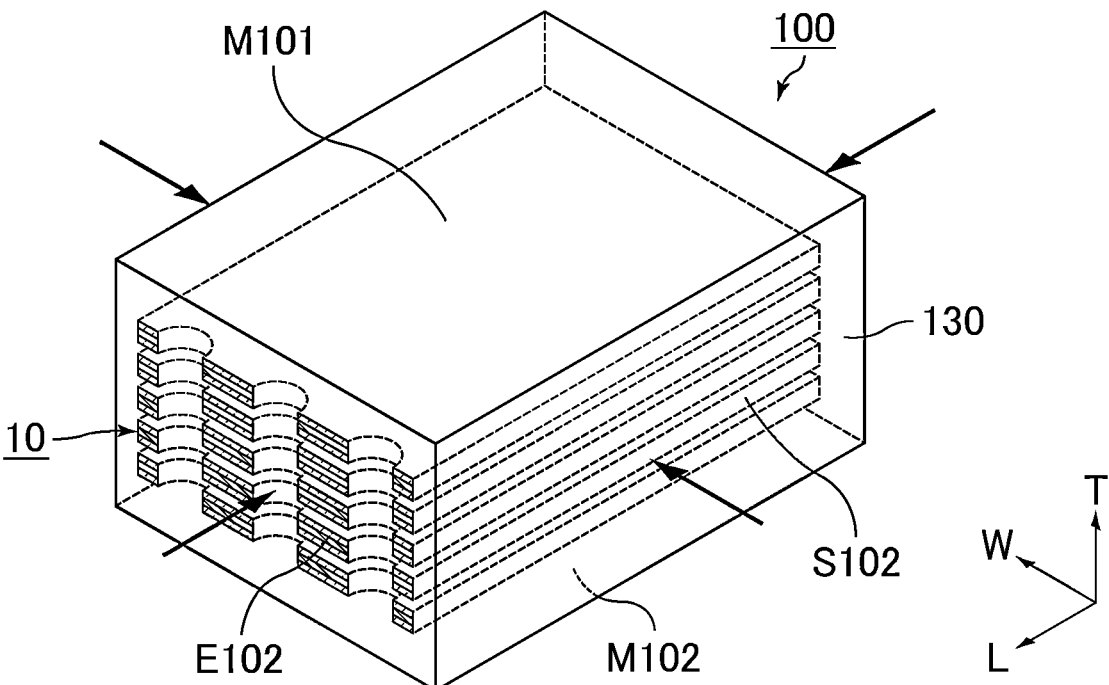
FIG. 2 is a perspective view schematically showing an example of a stack of electrolytic capacitor elements.

FIG. 1 and FIG. 2 are perspective views each schematically showing an example of a stack of the electrolytic capacitor elements. In FIG. 1, a first end face E101, which is a cathode-side end face, is shown in the foreground. In FIG. 2, a second end face E102, which is an anode-side end face, is shown in the foreground.

A stack 100 has a first main face M101 and a second main face M102 which oppose each other in the stacking direction (direction T), a first end face E101 and a second end face E102 which oppose each other in the longitudinal direction (direction L) perpendicular to the stacking direction, and a first side face S101 and a second side face S102 which oppose each other in a width direction (direction W) perpendicular to the stacking direction and the longitudinal direction.

Moisture may enter the stack 100. Herein, the directions of moisture entry to be focused are indicated by arrows in FIG. 1 and FIG. 2. Herein, the focus is placed on the prevention of corrosion of the metal foil caused by water entry from the first end face E101, the second end face E102, the first side face S101, or the second side face S102 of the stack.

Moisture may enter the stack 100 in a situation such as during the storage of the stack or during the storage of an electrolytic capacitor produced by forming an external electrode on the stack.

Figure 3:
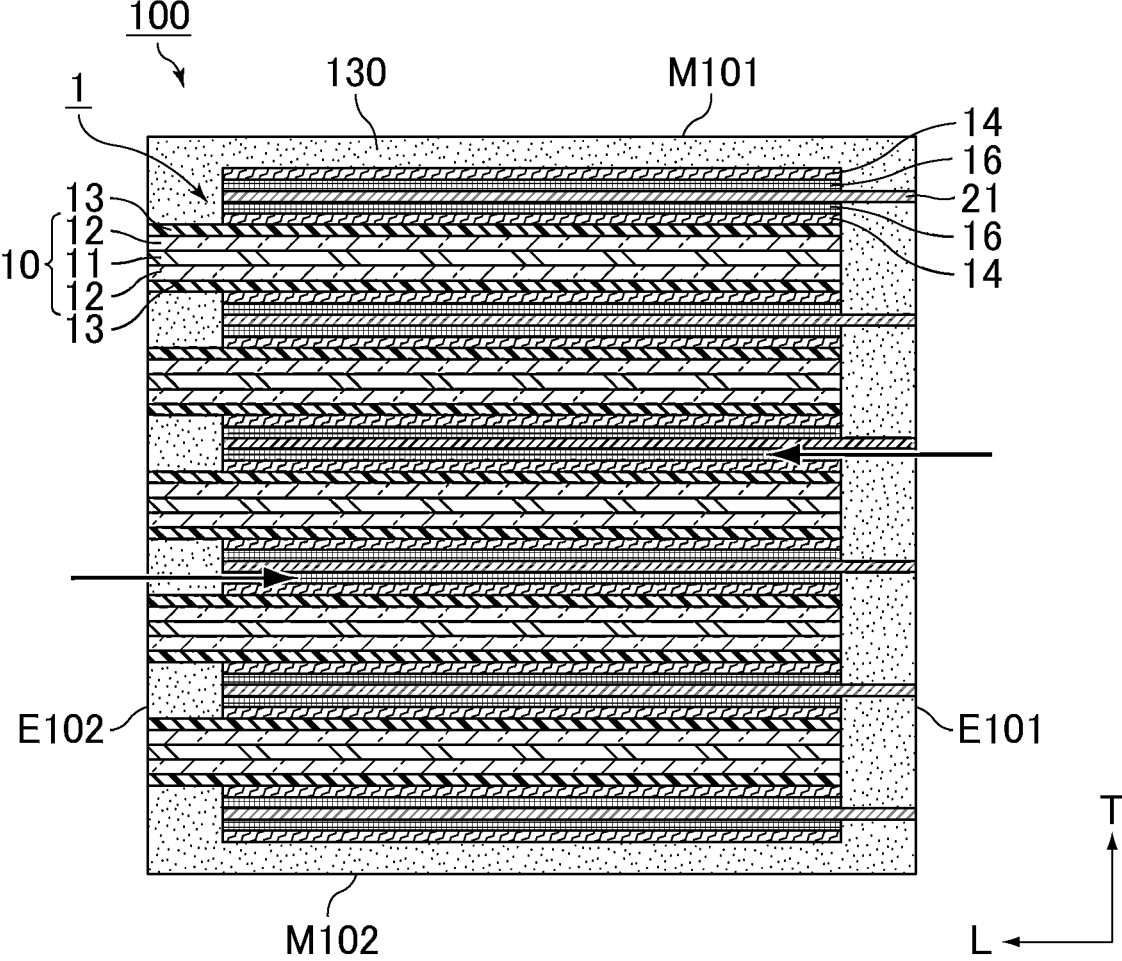
FIG. 3 is a cross-sectional view schematically showing an example of a stack of electrolytic capacitor elements.

FIG. 3 is a cross-sectional view schematically showing an example of a stack of the electrolytic capacitor elements and is an LT plane cross-sectional view of the stack. The cross-section is a plane cut along the longitudinal direction (direction L) and the stacking direction (direction T) of the stack.

FIG. 3 is also an A-A line cross-sectional view of FIG. 1.

In FIG. 3, the directions of moisture entry from the first end face E101 and the second end face E102 of the stack 100 are indicated by arrows.

The structure of the electrolytic capacitor element and the structure of the stack are described below with reference to FIG. 3.

An electrolytic capacitor element 1 in FIG. 3 includes a valve-acting metal substrate 10 including a core portion 11 made of metal foil and a porous portion 12 along the surface of the metal foil, a dielectric layer 13 on the porous portion 12, a solid electrolyte layer 14 on the dielectric layer 13, and a conductive layer 16 on the solid electrolyte layer 14.

The core portion 11 of the valve-acting metal substrate 10 is led to the second end face E102 of the stack 100 to constitute an anode-side end face. The core portion 11 is connected to an external anode electrode at the second end face E102 of the stack 100.

The valve-acting metal substrate is formed of a valve-acting metal having what is called valve action. Examples of the valve-acting metal include a single metal such as aluminum, tantalum, niobium, titanium, or zirconium, or an alloy containing these metals. Aluminum and an aluminum alloy are preferred among these.

The core portion 11 in the valve-acting metal substrate 10 is made of metal foil. Examples of the porous portion 12 include an etching layer on the surface of the valve-acting metal substrate and a porous layer formed by printing or sintering on the surface of the valve-acting metal substrate. An etching layer is preferred in the case where the valve-acting metal is aluminum or an aluminum alloy. A porous layer is preferred in the case where the valve-acting metal is titanium or a titanium alloy.

The dielectric layer 13 on the surface of the porous portion reflects the surface of the porous portion. Thus, the dielectric layer 13 is porous and has a surface with minute projections and depressions. The dielectric layer 13 preferably consists of an oxidized film of the valve-acting metal.

To increase production efficiency, the valve-acting metal substrate 10 having the dielectric layer 13 on its surface may be conversion foil prepared through a chemical conversion treatment.

Examples of materials constituting the solid electrolyte layer 14 include conductive polymers having a pyrrole skeleton, a thiophene skeleton, an aniline skeleton, or the like. Examples of a conductive polymer having a thiophene skeleton include poly(3,4-ethylenedioxythiophene) (PE- DOT). The conductive polymer may be PEDOT:PSS, which is a complex of PEDOT with poly(styrene sulfonate) (PSS) as a dopant.

The solid electrolyte layer 14 can be formed by, for example, a method in which a polymer film such as a poly(3,4-ethylenedioxythiophene) film is formed on a surface of the dielectric layer using a treatment liquid containing a monomer such as 3,4-ethylenedioxythiophene or a method in which a dispersion of a polymer such as poly(3, 4-ethylenedioxythiophene) is applied to a surface of the dielectric layer and dried. Preferably, a solid electrolyte layer to provide an inner layer for filling the pores (depressions) is formed first, and then a solid electrolyte layer to provide an outer layer for covering the entire dielectric layer is formed.

The solid electrolyte layer 14 can be formed in a predetermined region by applying the treatment liquid or the dispersion to the dielectric layer by, for example, sponge transfer, screen printing, spray coating, dispensing, or inkjet printing. The thickness of the solid electrolyte layer 14 is preferably 2 μm to 20 μm.

The conductive layer 16 includes a carbon layer. The conductive layer 16 may consist only of a carbon layer or may be a composite layer of a carbon layer and a silver layer on the carbon layer. FIG. 3 shows the conductive layer 16 consisting only of a carbon layer 16.

FIG. 3 shows a cathode foil 21 on the conductive layer 16. The cathode foil 21 is preferably metal foil and is preferably formed of a metal selected from the group consisting of aluminum, copper, silver, and an alloy containing at least one of these metals as a main component.

The cathode foil 21 is led to the first end face E101 to constitute a cathode-side end face. The cathode foil 21 is connected to an external cathode electrode at the first end face E101 of the stack 100.

The valve-acting metal substrate 10 includes the porous portion 12 on both faces of the core portion 11. Each porous portion 12 is provided with the dielectric layer 13 on its surface, and the dielectric layer 13 is provided with the solid electrolyte layer 14 thereon.

The conductive layer 16 and the cathode foil 21 are on or above the solid electrolyte layer 14.

Repetition of the above structure forms the stack 100 that includes a stack of the electrolytic capacitor elements 1 and that has an outer periphery sealed with a sealing material 130.

The carbon layer includes a carbon filler and a scaly insulating inorganic filler.

In a cut section of the electrolytic capacitor element in a direction perpendicular to the main face of the metal foil, an average of acute angles between the longitudinal direction of a cross-section of the insulating inorganic filler in the carbon layer adjacent to the main face of the metal foil and the longitudinal direction of a cross-section of the metal foil is 0° to 45°.

This specific feature of the disclosure is described below.

Figure 4:
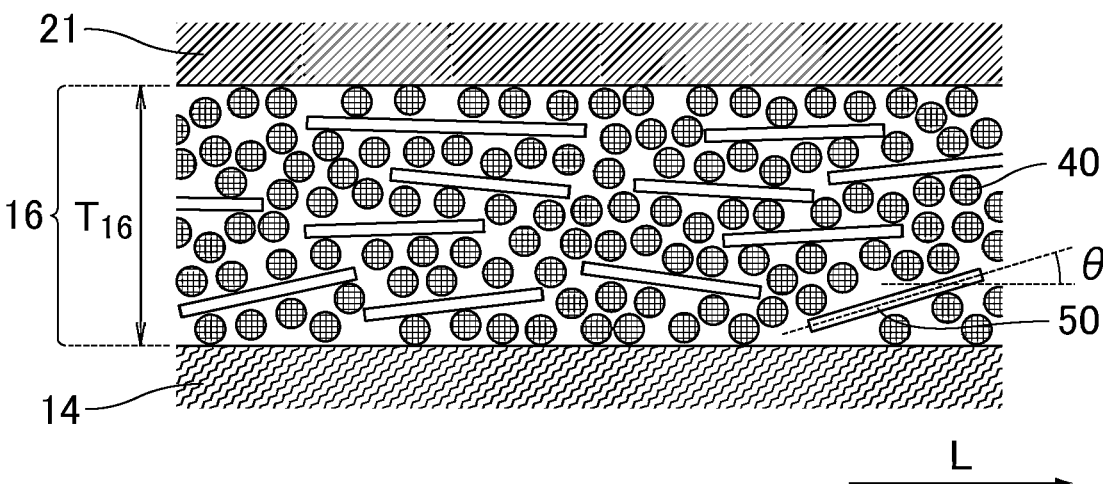
FIG. 4 is an enlarged cross-sectional view schematically showing an example of a carbon layer.

FIG. 4 is an enlarged cross-sectional view schematically showing an example of the carbon layer. FIG. 4 shows an enlarged cross-sectional view of the carbon layer in a cut section of the electrolytic capacitor element in a direction perpendicular to the main face of the metal foil.

The carbon layer 16 contains a spherical carbon filler 40 and a scaly insulating inorganic filler 50.

In FIG. 4, arrow L indicates a direction parallel to the main face of the metal foil. In FIG. 4, one acute angle is indicated by θ among angles each between the longitudinal direction of a cross-section of one scaly insulating inorganic filler 50 in FIG. 4 and the longitudinal direction of a cross-section of the metal foil.

The angle indicated by θ in FIG. 4 is determined for each scaly insulating inorganic filler observed in an electron microscope image of a cut section in a direction perpendicular to the main face of the metal foil. An average of the determined angles is 0° to 45°.

In the case where an angle between the longitudinal direction of a cross-section of the scaly insulating inorganic filler and the longitudinal direction of a cross-section of the metal foil in the cut section is within the range of the specific feature of the disclosure, the angle formed three-dimensionally between the flat face of the insulating inorganic filler and the main face of the metal foil is small. In other words, the scaly insulating inorganic filler is oriented with respect to the main face of the metal foil.

Figure 5:
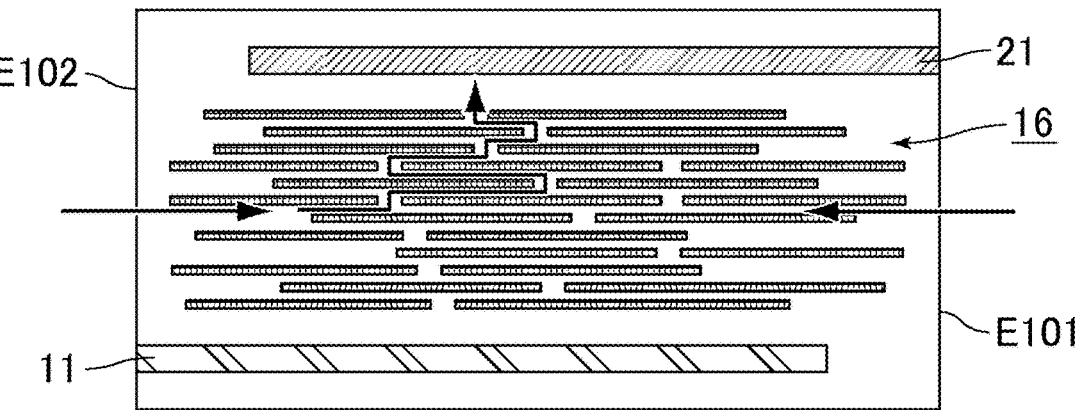
FIG. 5 is a schematic view showing a maze effect of a scaly insulating inorganic filler.

FIG. 5 is a schematic view showing a maze effect of the scaly insulating inorganic filler.

Since the carbon layer 16 is between the cathode foil 21 and the core portion 11 of the valve-acting metal substrate, FIG. 5 only shows the cathode foil 21, the core portion 11 of the valve-acting metal substrate, and the carbon layer 16 between the cathode foil 21 and the core portion 11.

Moisture entry to the carbon layer 16, specifically, moisture entry from the first end face E101 and the second end face E102 of the stack in the direction indicated by the arrows is discussed below.

FIG. 5 schematically shows an embodiment in which an angle between the longitudinal direction of a cross-section of the scaly insulating inorganic filler 50 and the longitudinal direction of a cross-section of the metal foil is 0° in the carbon layer 16. With the scaly insulating inorganic filler oriented as described above, moisture entered from the first end face E101 and the second end face E102 of the stack into the carbon layer 16 can be prevented from moving in the carbon layer 16 in the stacking direction and reaching the cathode foil 21 or the core portion 11. The moisture cannot pass through the scaly insulating inorganic filler 50. The moisture needs to go around the scaly inorganic filler to reach the cathode foil 21 or the core portion 11 and is therefore difficult to reach the cathode foil 21 or the core portion 11. Thus, corrosion of the cathode foil 21 or the core portion 11 by moisture can be prevented or reduced. In FIG. 5, the directions of moisture entry from the end faces of the stack are indicated by the arrows. FIG. 5 shows that the moisture is prevented from diffusing in the stacking direction. Similarly, diffusion of moisture entered from the side faces of the stack in the stacking direction can also be prevented or reduced.

The oriented scaly insulating inorganic filler has a maze effect. The maze effect refers to the effect of preventing moisture entered from the end faces or the side faces of the stack from diffusing in the stacking direction.

The electrolytic capacitor element of the present disclosure includes the scaly insulating inorganic filler, and the longitudinal direction of a cross section of the scaly insulating inorganic filler is oriented in a specific direction (0° to 45°) with respect to the longitudinal direction of a cross-section of the metal foil, thereby exhibiting the maze effect. Thus, corrosion of the metal foil by moisture entered from the end faces or the side faces of the stack can be prevented or reduced.

Figure 6:
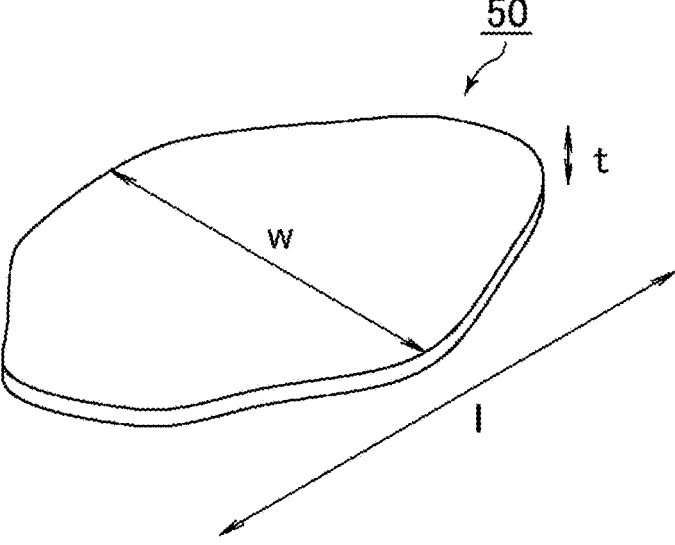
FIG. 6 is a perspective view schematically showing the shape of the scaly insulating inorganic filler.

FIG. 6 is a perspective view schematically showing the shape of the scaly insulating inorganic filler.

The scaly insulating inorganic filler 50 has a large flat face relative to the thickness thereof.

Provided that the thickness, the maximum length, and the maximum width of the scaly insulating inorganic filler 50 are defined as thickness t, length l, and width w, respectively, a product of the length and the width (l×w) is preferably larger than the thickness t. Specifically, the value of "(l×w)/t" is preferably equal to or larger than 4. Moreover, the value of "(l×w)/t" is preferably equal to or smaller than 400.

In FIG. 6, the thickness t, the length l, and the width w of the scaly insulating inorganic filler 50 are indicated by a double-headed arrow t, a double-headed arrow l, and a double-headed arrow W, respectively.

Although the product of the length and the width (l×w) is larger than the planar area of the insulating inorganic filler, the product is used as an approximation of the area in considering the ratio between the planar area and the thickness of the insulating inorganic filler.

The larger dimension of the length l and the width w is defined as the length l, while the smaller dimension is defined as the width w.

The ratio of the length l to the thickness t (l/t) is preferably equal to or more than 2, while the ratio (l/t) is preferably equal to or smaller than 20.

The ratio of the width w to the thickness t (w/t) is preferably equal to or more than 2, while the ratio (w/t) is preferably equal to or smaller than 20.

The length l of the scaly insulating inorganic filler is preferably 1 μm or more, while it is preferably 20 μm or less.

The width w of the scaly insulating inorganic filler is preferably 1 μm or more, while it is preferably 20 μm or less.

Each dimension of the scaly insulating inorganic filler observed in an electron microscope image of a cut section in a direction perpendicular to the main face of the metal foil is an average dimension of 10 or more of the scaly insulating inorganic filler in the carbon layer observed in the image. The ratios between the dimensions are ratios of the averages of the dimensions.

In an electron microscope image of a cut section in a direction perpendicular to the main face of the metal foil, when the filler observed has a rectangular shape with the sides in one direction being longer than the sides in the other direction as the scaly insulating inorganic filler 50 in FIG. 4, the dimension of the longer sides is defined as length and the dimension of the shorter sides is defined as thickness. A filler having a ratio (l/t) of the length l to the thickness t equal to or more than 2 may be considered as a scaly filler even if the width w is unknown.

The ratio $(1/T_{16})$ of the length l of the scaly insulating inorganic filler to the thickness (dimension indicated by the double-headed arrow $T_{16}$ in FIG. 4) of the carbon layer is preferably equal to or more than 0.05.

The scaly insulating inorganic filler contains an insulating material.

Examples of the insulating material include materials having a volume resistivity of $1 \times 10^{10}$ Ω·cm or more.

The entire filler may be made of an insulating material. Alternatively, the filler may consist of an insulating material prepared by forming an insulating film on the surface of a conductor such as a metal. Examples of the latter include a material including aluminum and a passivation film on the surface of the aluminum (an aluminum oxide film).

Specific examples include ceramic and glass, which are insulating materials. Examples of the ceramic include silica, alumina, zirconia, aluminum nitride, silicon nitride, cordierite, mullite, and yttria.

In particular, the material is preferably at least one selected from the group consisting of silica, alumina, and glass.

The carbon filler in the carbon layer may be a carbon filler usually used as a material in carbon layers in electrolytic capacitors. The carbon filler may have any shape. FIG. 4 shows the spherical carbon filler 40 as an example of the carbon filler.

The carbon filler may be a scaly carbon filler.

Figure 7:
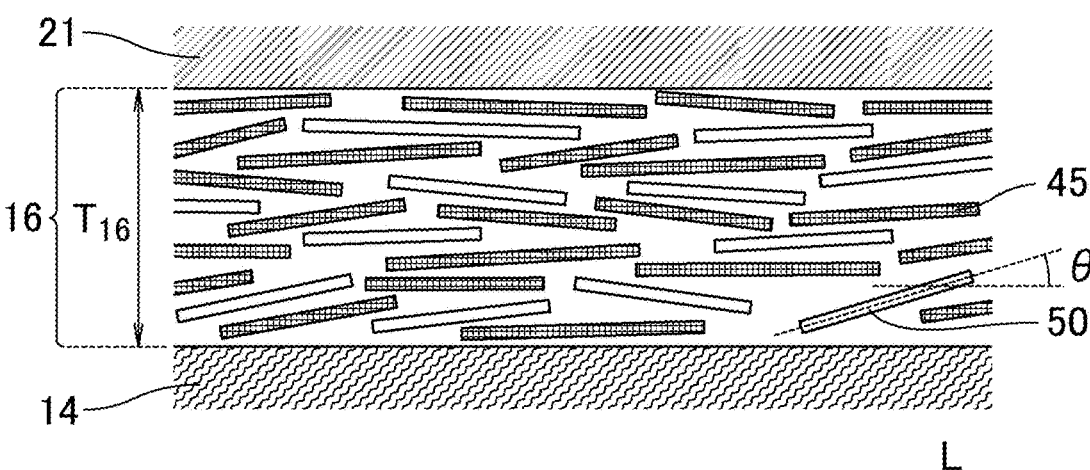
FIG. 7 is an enlarged cross-sectional view schematically showing another example of the carbon layer.

FIG. 7 is an enlarged cross-sectional view schematically showing another example of the carbon layer.

FIG. 7 shows an embodiment in which the carbon layer 16 contains a scaly carbon filler 45 instead of the spherical carbon filler 40 in FIG. 4.

When the carbon filler is a scaly carbon filler, acute angles are preferably 0° to 45° among angles between the longitudinal direction of a cross-section of the scaly carbon filler and the longitudinal direction of a cross-section of the metal foil in a cross-section cut in a direction perpendicular to the main surface of the metal foil. When the above condition is satisfied, the scaly carbon filler can exhibit the maze effect. Thus, corrosion of the metal foil by moisture entered from the end faces or the side faces of the stack can be prevented or reduced.

Preferably, a ratio ((weight of scaly insulating inorganic filler)/(weight of carbon filler+weight of scaly insulating inorganic filler)) of the weight of the scaly insulating inorganic filler to the total weight of the carbon filler and the scaly insulating inorganic filler in the carbon layer is 0.01 to 0.5.

When the scaly insulating inorganic filler is contained in the carbon layer such that the ratio is 0.01 or more, corrosion of the metal foil can sufficiently be prevented or reduced. Thus, the long-term reliability of the electrolytic capacitor can be improved. When the carbon filler, which is a conductive filler, is contained such that the ratio is 0.5 or less, the resistance value of the carbon layer can be reduced. Thus, the ESR of the electrolytic capacitor can be reduced.

The carbon layer may or may not include a non-scaly insulating inorganic filler other than the scaly insulating inorganic filler. In the carbon layer containing a non-scaly insulating inorganic filler, the weight ratio of the non-scaly insulating inorganic filler is 5% or less of the weight ratio of the scaly insulating inorganic filler.

The carbon layer may further contain a metal filler. Examples of the material of the metal filler include silver, copper, and aluminum. The metal filler itself may experience galvanic corrosion due to moisture. Thus, the carbon layer preferably contains no metal filler.

Next, exemplary embodiments of the electrolytic capacitor and the stack of the present disclosure other than the embodiment shown in FIG. 1, FIG. 2, or FIG. 3 are described below.

Figure 8:
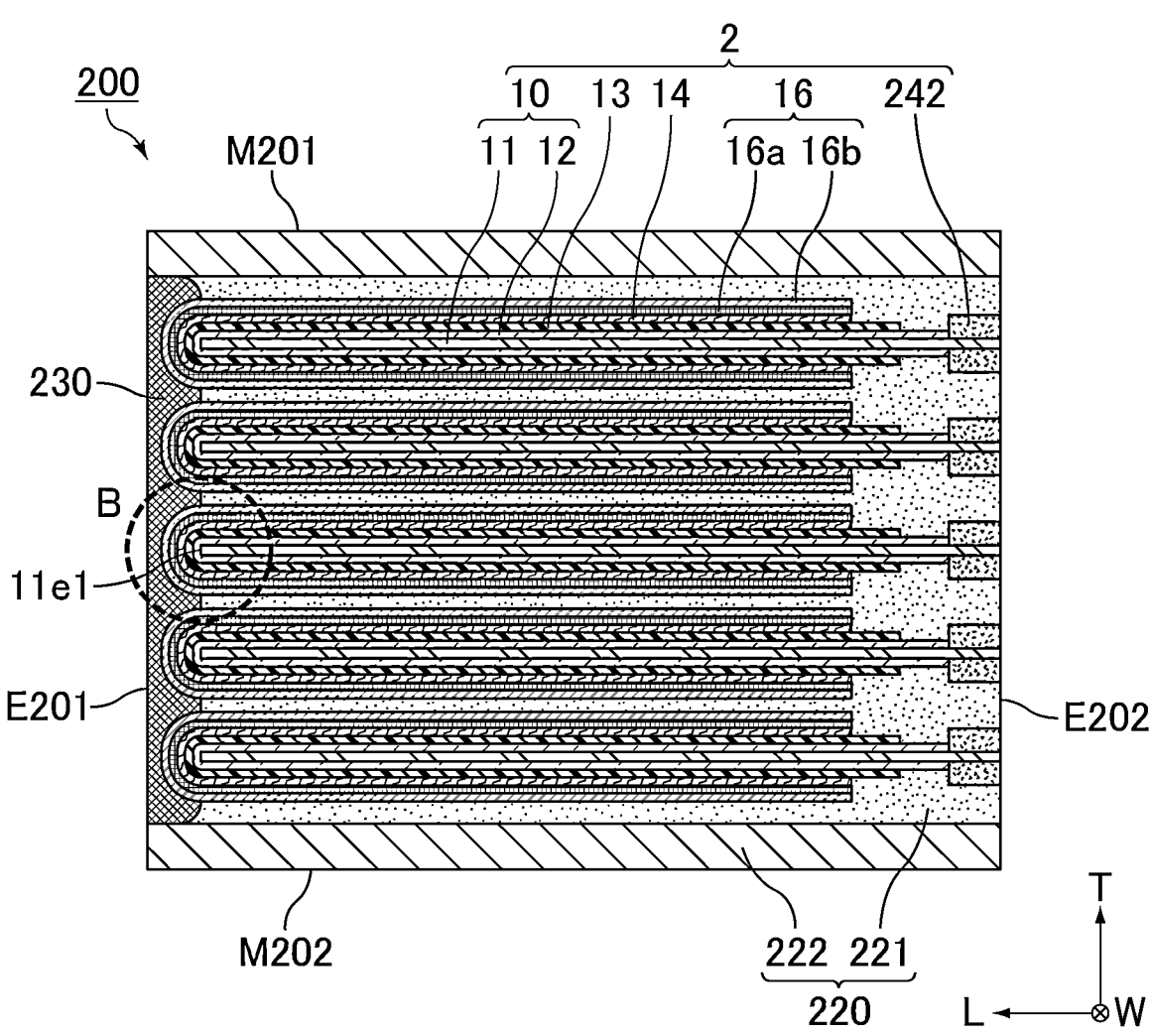
FIG. 8 is an LT plane cross-sectional view schematically showing another example of the stack of electrolytic capacitor elements.

FIG. 8 is an LT plane cross-sectional view schematically showing another example of a stack of electrolytic capacitor elements.

An electrolytic capacitor element 2 in FIG. 8 includes a valve-acting metal substrate 10 including a core portion 11 made of metal foil and a porous portion 12 along a surface of the metal foil; a dielectric layer 13 on the porous portion 12; a solid electrolyte layer 14 on the dielectric layer 13; and a conductive layer 16 on the solid electrolyte layer 14.

The conductive layer 16 includes a carbon layer 16a and a silver layer 16b.

A stack 200 includes a stack of the electrolytic capacitor elements 2 and an exterior body 220 sealing the outer periphery.

The exterior body 220 includes a first exterior body 221 and a second exterior body 222 which seal the periphery of the electrolytic capacitor element 2. The second exterior body 222 is at the outermost periphery of the stack 200. The second exterior body 222 defines a first main face M201, a second main face M202, a first side face (S201: not shown in FIG. 7), and a second side face (S202: not shown in FIG. 7) of the stack 200.

The core portion 11 of the valve-acting metal substrate 10 is led to the second end face E202 of the stack 200 to constitute an anode-side end face of the stack 200. The core portion 11 is connected to an external anode electrode at the second end face E202 of the stack 200.

A mask layer 242, which is an insulating component, is at the vicinity of the anode-side end face of the valve-acting metal substrate 10.

A current collector electrode 230 is at the first end face E201 of the stack 200 and is electrically connected to a cathode of each electrolytic capacitor element 2. As shown in FIG. 8, the current collector electrode 230 is exposed to the first end face E201 of the stack 200 to define a cathode-side end face of the stack 200. The current collector electrode 230 is connected to an external cathode electrode at the first end face E201 of the stack 200.

In the electrolytic capacitor element 2 in FIG. 8, the dielectric layer 13, the solid electrolyte layer 14, and the conductive layer 16 are also adjacent to side faces and one end face of the valve-acting metal substrate 10.

In a cut section of the electrolytic capacitor element in a direction perpendicular to the main face of the metal foil, an average of acute angles between the longitudinal direction of a cross-section of the scaly insulating inorganic filler in the carbon layer adjacent to the side faces and an end face of the metal foil and the longitudinal direction of a cross-section of the metal foil is 45° to 90°.

First, the "carbon layer adjacent to one end face of the metal foil" is described.

The area to be focused is the area in region B in FIG. 8. The area is in the vicinity of the cathode-side end face of the metal foil. The area in the vicinity of the anode-side end face of the metal foil includes no carbon layer and is thus not focused.

Figure 9:
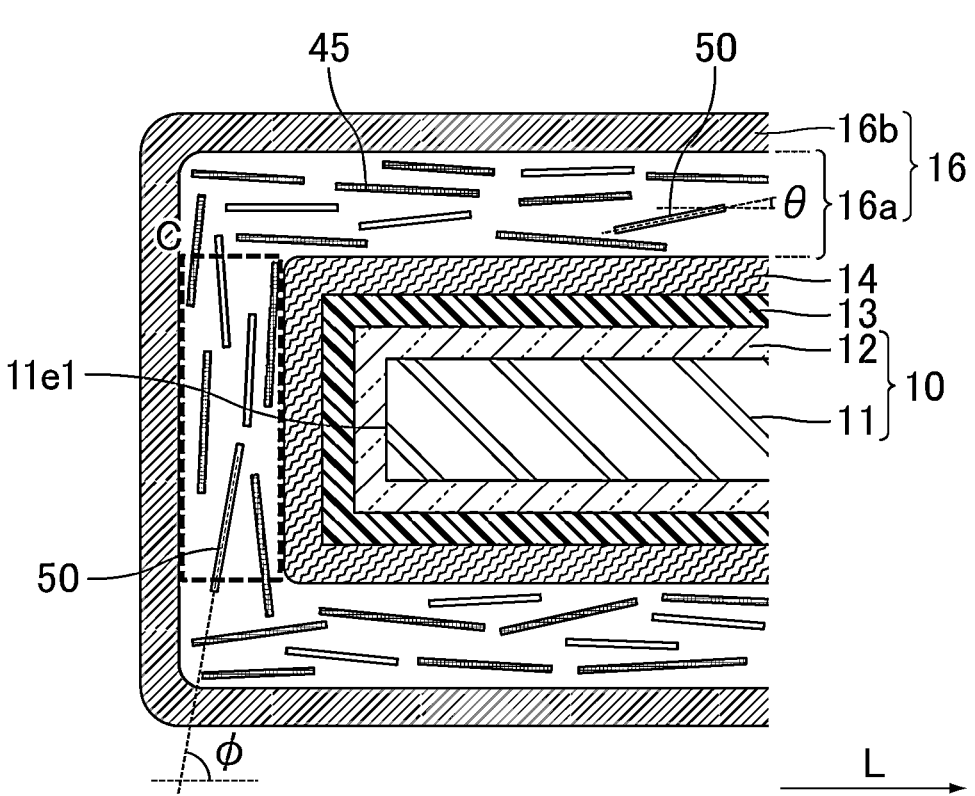
FIG. 9 is an enlarged cross-sectional view schematically showing the area in region B in FIG. 8.

FIG. 9 is an enlarged cross-sectional view schematically showing the area in the region B in FIG. 8.

The "one end face of the metal foil" refers to an end face of the core portion made of metal foil. FIG. 9 shows the position of a first end face 11e1, which is an end face of the core portion 11, of the metal foil.

The porous portion 12, the dielectric layer 13, the solid electrolyte layer 14, and the conductive layer 16 are along the surface of the first end face 11e1 of the metal foil. The conductive layer 16 includes a carbon layer 16a and a silver layer 16b.

The "carbon layer adjacent to one end face of the metal foil" is an area in region C in FIG. 9.

The carbon layer 16a contains a scaly insulating inorganic filler 50 and a scaly carbon filler 45.

The longitudinal direction of a cross-section of the metal foil (direction parallel to the main face of the metal foil) is indicated by arrow L in FIG. 9. In FIG. 9, one acute angle is indicated by $\phi$ among angles each between the longitudinal direction of a cross-section of one scaly insulating inorganic filler 50 in the carbon layer (region C) adjacent to one end face of the metal foil and the longitudinal direction of a cross-section of the metal foil.

The angle indicated by $\phi$ in FIG. 9 is determined for each scaly insulating inorganic filler observed in an electron microscope image of a cut section in a direction perpendicular to the main face of the metal foil. An average of the determined angles is 45° to 90°.

With the scaly insulating inorganic filler in the carbon layer oriented as described above, the maze effect prevents moisture entering from the first end face E201 of the stack 200 from moving through the carbon layer 16a, which is adjacent to one end face of the metal foil, in the thickness direction of the carbon layer and reaching the core portion 11.

In FIG. 9, one acute angle is indicated by θ among angles each between the longitudinal direction of a cross-section of one scaly insulating inorganic filler 50 in the carbon layer adjacent to the main face of the metal foil and the longitudinal direction of a cross-section of the metal foil. The acute angle is 0° to 45° as in the embodiment described with reference to FIG. 4.

FIG. 9 shows an embodiment in which the carbon layer 16a contains the scaly carbon filler 45. Acute angles are preferably 45° to 90° among angles each between the longitudinal direction of a cross-section of the scaly carbon filler 45 in the carbon layer (region C) adjacent to one end face of the metal foil and the longitudinal direction of a cross-section of the metal foil. This structure can more effectively prevent or reduce corrosion of the metal foil by moisture entering from the first end face of the stack.

Next, the "carbon layer adjacent to a side face of the metal foil" is described.

Figure 10:
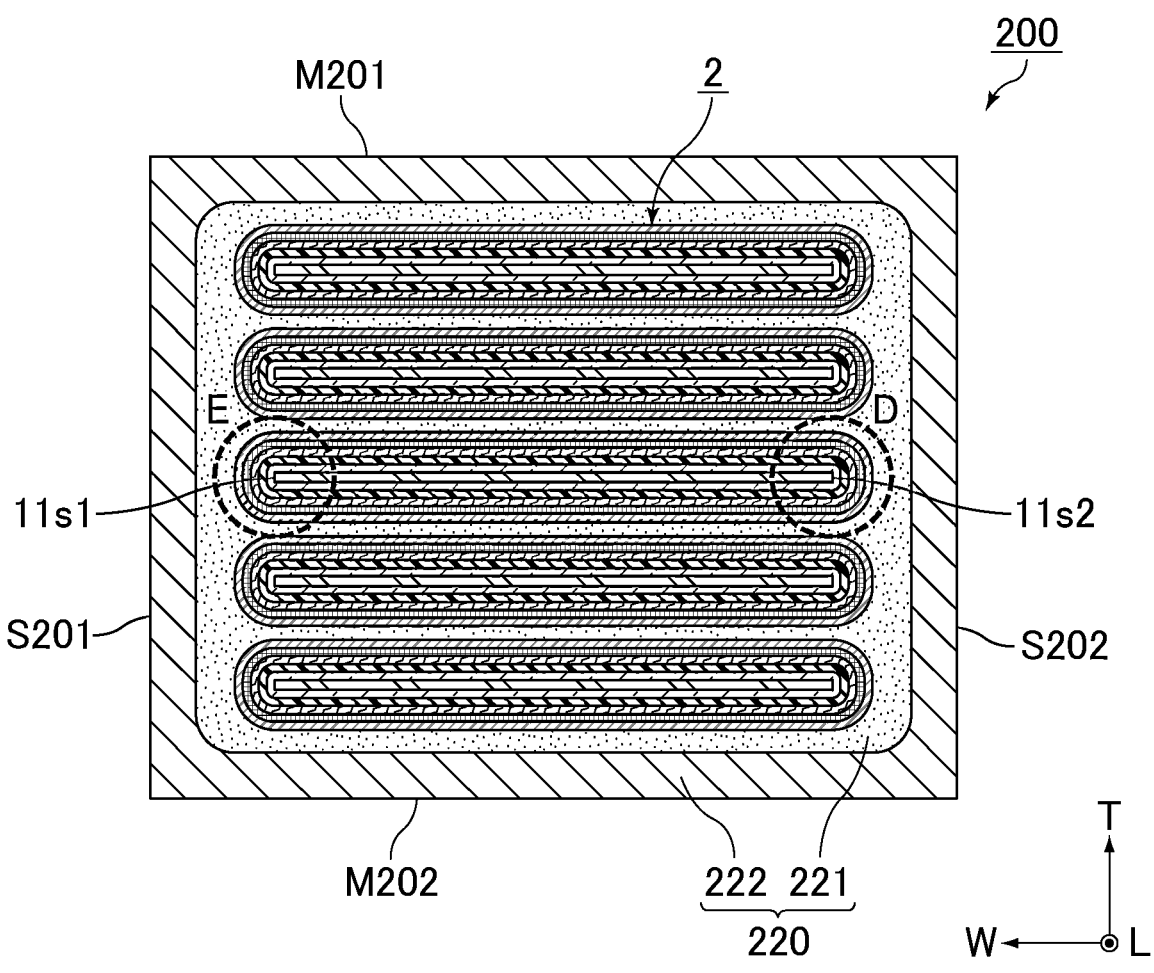
FIG. 10 is a WT plane cross-sectional view schematically showing an example of a stack of electrolytic capacitor elements.

FIG. 10 is a WT face cross-sectional view schematically showing an example of a stack of electrolytic capacitor elements.

The areas to be focused are the area in region D and the area in region E in FIG. 10. The region D and the region E are in the vicinity of the side faces of the metal foil.

The region D is an area in the vicinity of the second side face 11s2 of the metal foil. The region E is an area in the vicinity of the first side face 11s1 of the metal foil.

Figure 11:
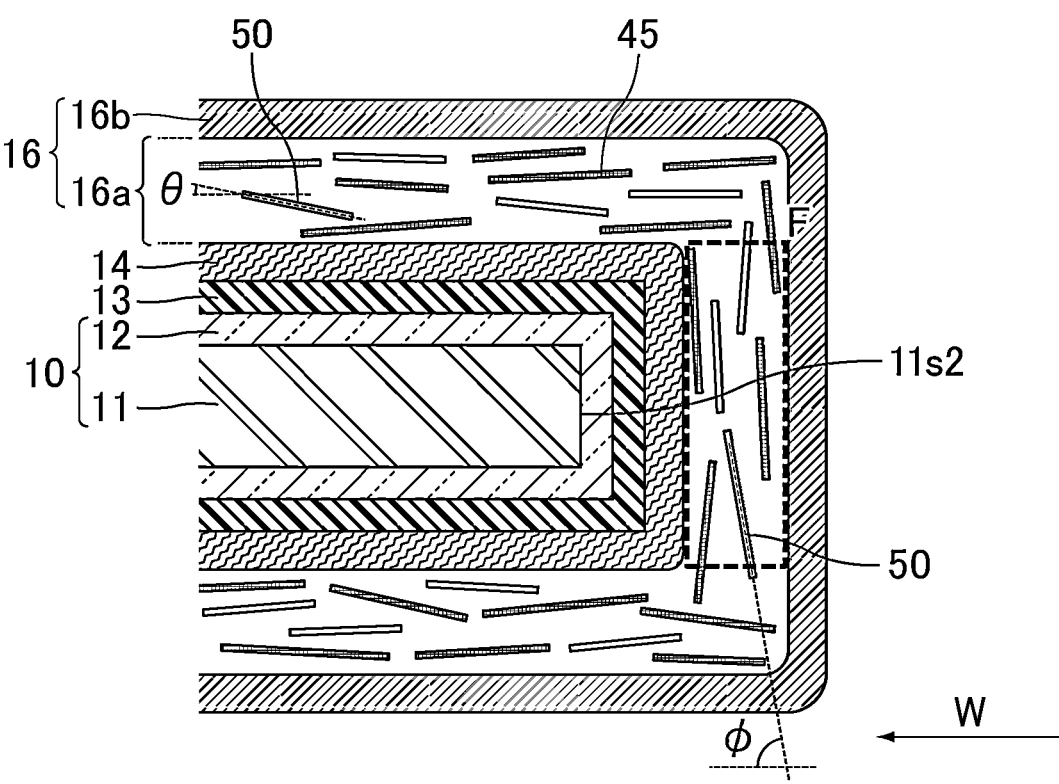
FIG. 11 is an enlarged cross-sectional view schematically showing the area in region D in FIG. 10.

FIG. 11 is an enlarged cross-sectional view schematically showing the area in the region D in FIG. 10.

The "side face of the metal foil" refers to a side face of the core portion made of metal foil. FIG. 11 shows the position of a second side face 11s2, which is a side face of the core portion 11, of the metal foil.

The porous portion 12, the dielectric layer 13, the solid electrolyte layer 14, and the conductive layer 16 are along the surface of the second side face 11s2 of the metal foil. The conductive layer 16 includes a carbon layer 16a and a silver layer 16b.

The "carbon layer adjacent to a side face of the metal foil" is an area in region F in FIG. 11.

The carbon layer 16a contains a scaly insulating inorganic filler 50 and a scaly carbon filler 45. In FIG. 11, one acute angle is indicated by φ among angles each between the longitudinal direction of a cross-section of one scaly insulating inorganic filler 50 in the region and the longitudinal direction of a cross-section of the metal foil.

The angle indicated by φ in FIG. 11 is determined for each scaly insulating inorganic filler observed in an electron microscope image of a cut section in a direction perpendicular to the main face of the metal foil. An average of the determined angles is 45° to 90°.

With the scaly insulating inorganic filler in the carbon layer oriented as described above, the maze effect prevents moisture entering from the second side face S202 of the stack 200 from moving through the carbon layer 16a, which is adjacent to the second side face of the metal foil, in the thickness direction of the carbon layer and reaching the core portion 11.

The carbon layer adjacent to the first side face 11s1 of the metal foil may have the same structure as the carbon layer adjacent to the second side face 11s2 of the metal foil. The above-described effect can also be achieved for moisture entering from the first side face S201 of the stack 200.

The electrolytic capacitor of the present disclosure includes a stack of the electrolytic capacitor elements of the present disclosure, an external anode electrode, and an external cathode electrode.

Figure 12:
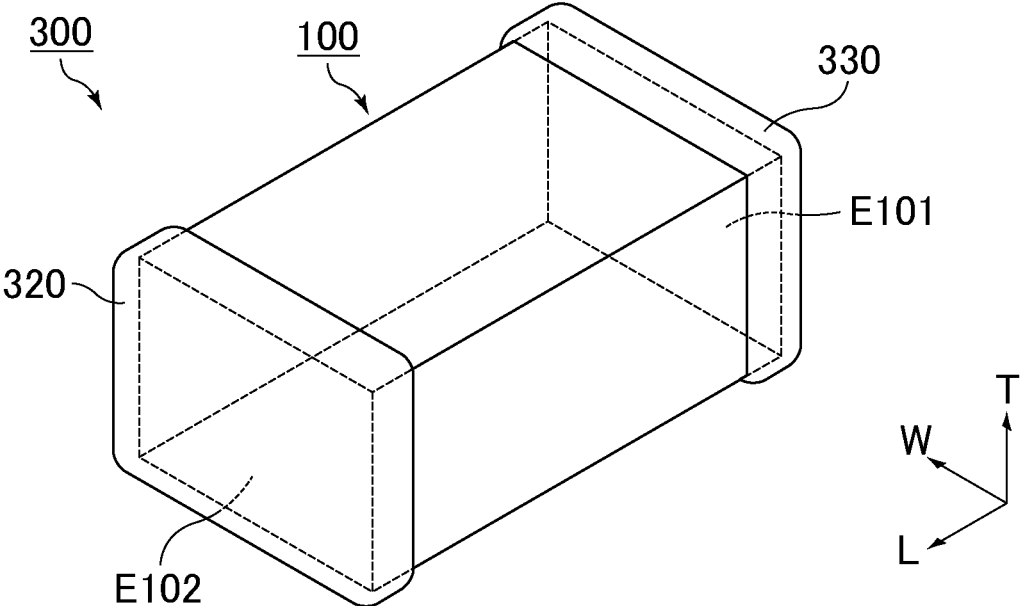
FIG. 12 is a perspective view schematically showing an example of an electrolytic capacitor.

FIG. 12 is a perspective view schematically showing an example of the electrolytic capacitor.

In an electrolytic capacitor 300 in FIG. 12, an external anode electrode 320 is on a second end face E102 of the stack 100 (see, FIG. 1, FIG. 2, and FIG. 3), and an external cathode electrode 330 is on a first end face E101 of the stack.

The external anode electrode and the external cathode electrode may have any structure conventionally used in external electrodes of electrolytic capacitors.

Usable structures of the external anode electrode and the external cathode electrode may be structures each including an optional combination of layers such as a sputtered film and/or a vapor-deposited film, a resin electrode layer, and a plating layer.

In the production of the electrolytic capacitor element of the present disclosure or the electrolytic capacitor of the present disclosure, a carbon paste, which is a material to form the carbon layer, is mixed with a carbon filler and a scaly insulating inorganic filler.

The carbon paste may contain a resin component such as an epoxy resin or a phenol resin.

The carbon layer can be formed by applying the carbon paste to the solid electrolyte layer by coating, immersion, or other methods.

To obtain the stack 100 having the structure shown in FIG. 3, the carbon layer is preferably formed by applying the carbon paste to the solid electrolyte layer. The application of the carbon paste may be performed by screen printing, sponge transcription, spray coating, dispenser coating, inkjet printing, or other methods.

In the case of screen printing, the carbon paste is preferably applied while adding a shear stress to the carbon paste in one direction with a squeegee. This technique allows the scaly insulating inorganic filler to be more easily oriented nearly in parallel to the face to be printed.

A reduction in the amounts of the carbon filler and the scaly insulating inorganic filler in the carbon paste allows the scaly insulating inorganic filler to be more easily oriented nearly in parallel to the face to be printed during drying.

To obtain the stack 200 having the structure shown in FIG. 8, the carbon layer is preferably formed by immersing an element already provided with a dielectric layer and a solid electrolyte layer on or above the valve-acting metal substrate in the carbon paste.

Steps other than the formation of the carbon layer may be performed by a method conventionally performed to produce electrolytic capacitor elements and electrolytic capacitors.

REFERENCE SIGNS LIST 1, 2 electrolytic capacitor element
10 valve-acting metal substrate
11 core portion (metal foil)
11e1 one end face (first end face) of metal foil
11s1 first side face of metal foil
11s2 second side face of metal foil
12 porous portion
13 dielectric layer

14 solid electrolyte layer
16 conductive layer (carbon layer)
16a carbon layer
16b silver layer
21 cathode foil
40 (spherical) carbon filler
45 (scaly) carbon filler
50 scaly insulating inorganic filler
100 stack
M101 first main face
M102 second main face
E101 first end face
E102 second end face
S101 first side face
S102 second side face
130 sealing material
200 stack
M201 first main face
M202 second main face
E201 first end face
E202 second end face
S201 first side face
S202 second side face
220 exterior body
221 first exterior body
222 second exterior body
230 current collector electrode
242 mask layer
300 electrolytic capacitor
320 external anode electrode
330 external cathode electrode

The invention claimed is:

1. An electrolytic capacitor element, comprising:
a valve-acting metal substrate comprising a core portion made of metal foil and a porous portion along a surface of the metal foil;
a dielectric layer on the porous portion;
a solid electrolyte layer on the dielectric layer; and
a conductive layer on the solid electrolyte layer, the conductive layer comprising a carbon layer, and the carbon layer containing a carbon filler and a scaly insulating inorganic filler,
wherein, in a cut section of the electrolytic capacitor element in a direction perpendicular to a main face of the metal foil, an average of acute angles between a longitudinal direction of a cross-section of the insulating inorganic filler in the carbon layer adjacent to the main face of the metal foil and a longitudinal direction of a cross-section of the metal foil is 0° to 45°.

2. The electrolytic capacitor element according to claim 1, wherein the dielectric layer, the solid electrolyte layer, and the conductive layer are adjacent to side faces and a first end face of the valve-acting metal substrate, and, in a cut section of the electrolytic capacitor element in a direction perpendicular to the main face of the metal foil, an average of acute angles between a longitudinal direction of a cross-section of the insulating inorganic filler in the carbon layer adjacent to the side faces and the first end face of the metal foil and a longitudinal direction of a cross-section of the metal foil is 45° to 90°.

3. The electrolytic capacitor element according to claim 1, wherein the carbon filler comprises a scaly carbon filler.

4. The electrolytic capacitor element according to claim 1, wherein the insulating inorganic filler is at least one selected from silica, alumina, and glass.

5. The electrolytic capacitor element according to claim 1, wherein the conductive layer is a composite layer including the carbon layer.

6. The electrolytic capacitor element according to claim 5, wherein the composite layer further includes a silver layer.

7. The electrolytic capacitor element according to claim 1, further comprising a cathode foil on the conductive layer.

8. The electrolytic capacitor element according to claim 1, wherein the carbon filler is spherical.

9. The electrolytic capacitor element according to claim 1, wherein a product of a length multiplied by a width of the scaly insulating inorganic filler is larger than a thickness of the scaly insulating inorganic filler.

10. The electrolytic capacitor element according to claim 9, wherein the product of the length multiplied by the width and then divided by the thickness of the scaly insulating inorganic filler is 4 to 400.

11. The electrolytic capacitor element according to claim 9, wherein a ratio of the length to the thickness of the scaly insulating inorganic filler is 2 to 20.

12. The electrolytic capacitor element according to claim 9, wherein a ratio of the width to the thickness of the scaly insulating inorganic filler is 2 to 20.

13. The electrolytic capacitor element according to claim 9, wherein a ratio of the length of the scaly insulating inorganic filler to a thickness of the carbon layer is equal to or more than 0.05.

14. The electrolytic capacitor element according to claim 1, wherein the scaly insulating inorganic filler contains an insulating material.

15. The electrolytic capacitor element according to claim 14, wherein the insulating material has a volume resistivity of $1 \times 1010$ Ω·cm or more.

16. The electrolytic capacitor element according to claim 14, wherein the insulating material is ceramic or glass.

17. The electrolytic capacitor element according to claim 14, wherein the insulating material is ceramic, and the ceramic is at least one selected from silica, alumina, zirconia, aluminum nitride, silicon nitride, cordierite, mullite, and yttria.

18. The electrolytic capacitor element according to claim 1, wherein a ratio of a weight of the scaly insulating inorganic filler to a total weight of the carbon filler and the scaly insulating inorganic filler in the carbon layer is 0.01 to 0.5.

19. An electrolytic capacitor, comprising:
a stack of the electrolytic capacitor elements according to claim 1,
an external anode electrode electrically connected to the core portion; and
an external cathode electrode electrically connected to the carbon layer.

* * * * *